(12) United States Patent
Durocher et al.

(10) Patent No.: US 7,909,570 B2
(45) Date of Patent: Mar. 22, 2011

(54) INTERTURBINE DUCT WITH INTEGRATED BAFFLE AND SEAL

(75) Inventors: Eric Durocher, Vercheres (CA); Rene Paquet, Montreal (CA)

(73) Assignee: Pratt & Whitney Canada Corp., Longueui, Quebec (CA)

( * ) Notice: Subject to any disclaimer, the term of this patent is extended or adjusted under 35 U.S.C. 154(b) by 824 days.

(21) Appl. No.: 11/509,604

(22) Filed: Aug. 25, 2006

(65) Prior Publication Data

US 2008/0050229 A1 Feb. 28, 2008

(51) Int. Cl.
*F01D 13/02* (2006.01)

(52) U.S. Cl. ...................... 415/174.5; 415/230

(58) Field of Classification Search .................. 415/110, 415/111, 135, 142, 174.2, 174.5, 199.5, 230, 415/215.1
See application file for complete search history.

(56) References Cited

U.S. PATENT DOCUMENTS

| | | |
|---|---|---|
| 2,445,661 A | 7/1948 | Constant et al. |
| 2,591,399 A | 4/1952 | Buckland et al. |
| 2,955,800 A | 10/1960 | Miller et al. |
| 3,078,071 A | 2/1963 | Henny et al. |
| 3,314,648 A | 4/1967 | Howald |
| 3,589,475 A * | 6/1971 | Alford .......................... 188/381 |
| 3,759,038 A | 9/1973 | Scalzo et al. |
| 4,016,718 A | 4/1977 | Lauck |
| 4,135,362 A | 1/1979 | Glenn |
| 4,406,460 A * | 9/1983 | Slayton .......................... 277/401 |
| 4,428,713 A * | 1/1984 | Coplin et al. .................... 415/48 |
| 4,487,015 A | 12/1984 | Slattery et al. |
| 4,747,750 A | 5/1988 | Chlus et al. |
| 5,016,436 A | 5/1991 | Belcher et al. |
| 5,201,846 A | 4/1993 | Sweeney |
| 5,211,541 A | 5/1993 | Fledderjohn et al. |
| 5,215,440 A | 6/1993 | Narayana et al. |
| 5,333,443 A | 8/1994 | Halila |
| 5,335,490 A | 8/1994 | Johnson et al. |
| 5,445,004 A | 8/1995 | Nannini et al. |
| 5,472,313 A | 12/1995 | Quinones et al. |
| 5,485,717 A | 1/1996 | Williams |
| 5,545,004 A | 8/1996 | Ho et al. |
| 5,609,467 A | 3/1997 | Lenhart et al. |
| 6,012,684 A | 1/2000 | Umney et al. |
| 6,109,022 A | 8/2000 | Allen et al. |
| 6,131,384 A | 10/2000 | Ebel |
| 6,286,303 B1 | 9/2001 | Pfligler et al. |
| 6,447,252 B1 | 9/2002 | Barker et al. |
| 6,463,992 B1 | 10/2002 | Dowhan et al. |
| 6,568,187 B1 | 5/2003 | Jorgensen et al. |
| 6,640,547 B2 | 11/2003 | Leahy, Jr. |
| 7,229,247 B2 * | 6/2007 | Durocher et al. .......... 415/174.2 |
| 7,229,249 B2 * | 6/2007 | Durocher et al. .......... 415/213.1 |

* cited by examiner

*Primary Examiner* — Nathaniel Wiehe
(74) *Attorney, Agent, or Firm* — Ogilvy Renault

(57) ABSTRACT

An integrated duct, baffle and knife edge seal arrangement employing the radially inner distal edge of the baffle for sealing the radially inner stator/rotor interface of an interstage cavity.

8 Claims, 3 Drawing Sheets

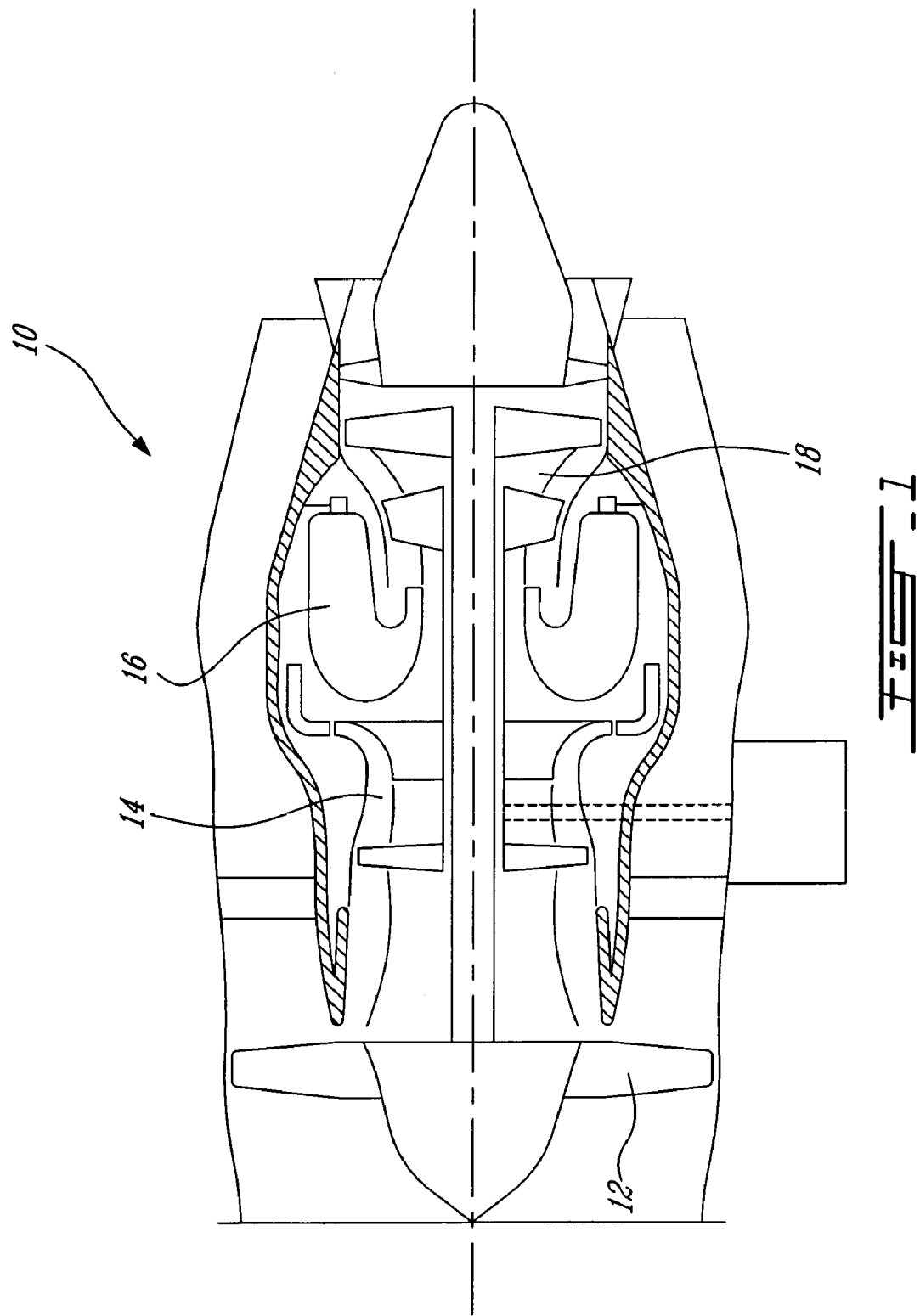

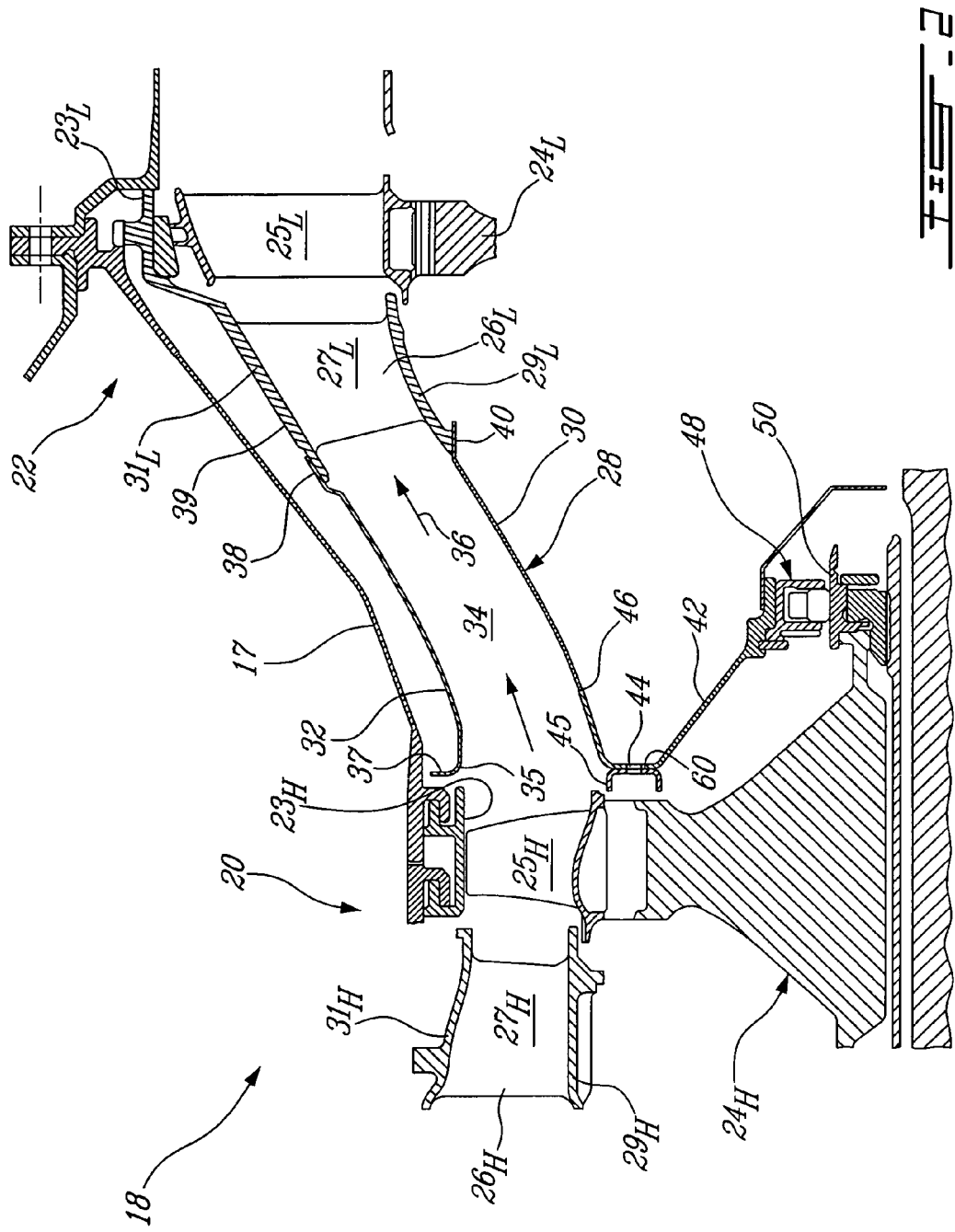

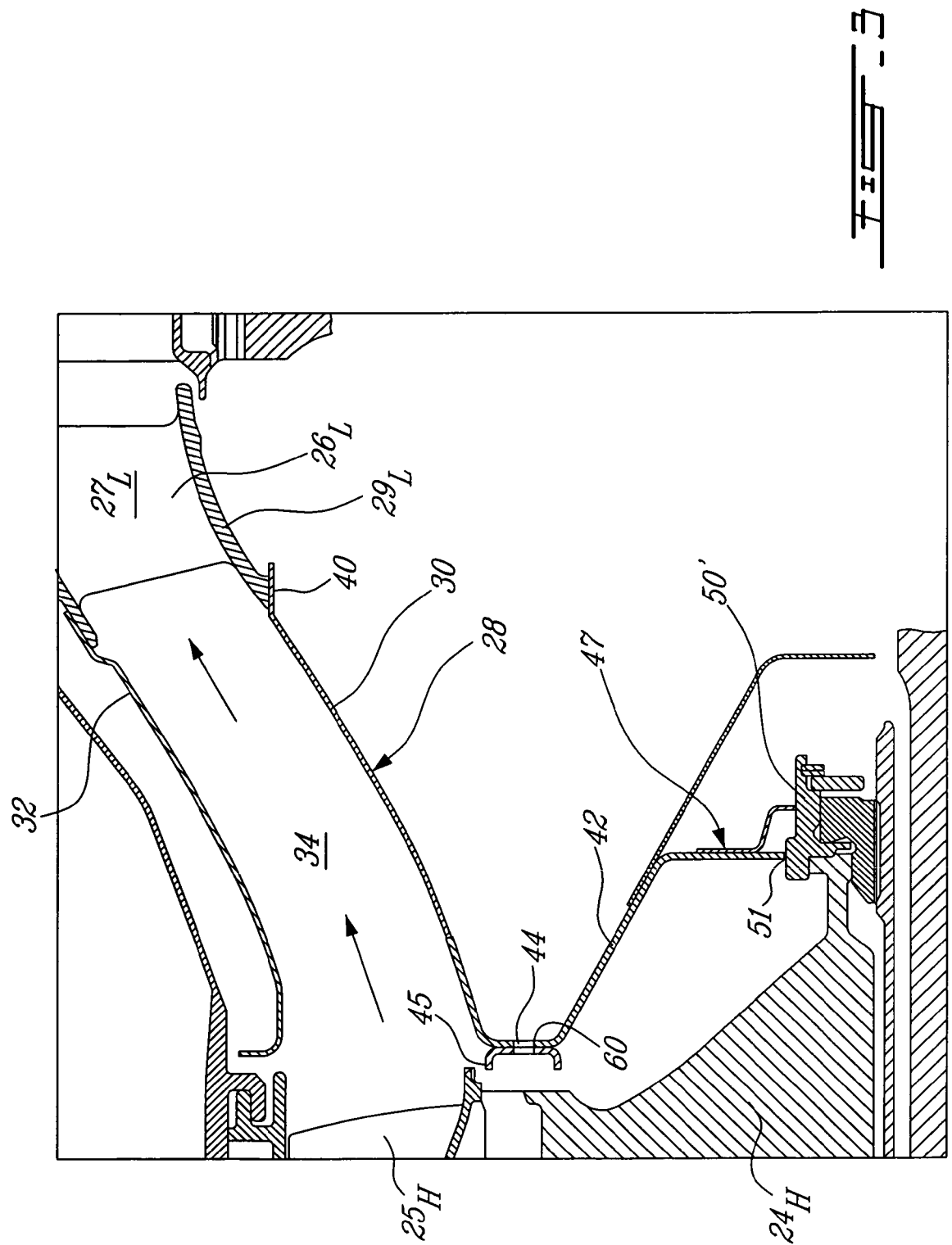

US 7,909,570 B2

INTERTURBINE DUCT WITH INTEGRATED BAFFLE AND SEAL

TECHNICAL FIELD

The invention relates generally to gas turbine engines and, more particularly, to a new duct, baffle and seal arrangement.

BACKGROUND OF THE ART

Interturbine ducts (ITD) are used for channelling hot combustion gases from a high pressure turbine stage to a low pressure turbine stage. The ITD is typically integrally cast with the stator vane set of the low pressure turbine stage. Lug and slot arrangements are typically used to connect the inner annular wall of the cast ITD to an inner baffle protecting the rear facing side of the high pressure turbine rotor. A separate annular seal is provided between the baffle and a rearwardly extending portion of the high pressure turbine rotor in order to seal the inter-stage cavity.

Although various baffle sealing arrangement have been proposed in the past, there is still a continuing need for a simpler baffle sealing arrangement.

SUMMARY OF THE INVENTION

It is therefore an aim of the present invention to provide a new gas turbine engine duct, baffle and seal arrangement.

In one aspect, the present invention provides an interturbine duct, baffle and seal arrangement adapted to be mounted between first and second adjacent turbine stages of a gas turbine engine, comprising inner and outer flow path containing walls adapted to contain hot combustion gases therebetween, a baffle integral to the inner flow path containing wall, said baffle defining a boundary of an inter-stage cavity behind the first turbine stage, and a knife edge seal integrated to a radially inwardly extending distal end portion of the baffle and having a tight tip clearance with a seal runner for sealing said inter-stage cavity.

In a second aspect, the present invention provides an interturbine duct, baffle and seal arrangement adapted to be mounted between first and second adjacent turbine stages of a gas turbine engine, comprising an interturbine duct having inner and outer sheet metal walls adapted to contain hot combustion gases therebetween, an angularly disposed sheet metal baffle extending integrally rearwardly from a front end of the inner sheet metal wall, said sheet metal baffle defining a boundary of an inter-stage cavity behind the first turbine stage, and a knife edge seal assembly for sealing said inter-stage cavity, said knife edge seal assembly including a seal runner and a radially inner distal edge of the sheet metal baffle.

In a third aspect, the present invention provides an interturbine duct, baffle and seal arrangement for a multi-stage turbine engine having an upstream rotor disk carrying a plurality of turbine blades and a downstream stage of turbine vanes, the arrangement comprising a duct extending axially between the upstream rotor disk and the downstream stage of turbine vanes and defining a flow path therebetween, a baffle extending from an upstream end of a radially inner wall of the duct, the radially inner wall and the baffle defining a hairpin cross-section shape, the baffle having a distal end portion defining a radially inner bend, the distal end portion having a radially inwardly facing annular edge juxtaposed to a radially outwardly facing surface of a sealing ring mounted to the upstream rotor disk, the annular edge and the sealing ring defining a knife edge seal assembly.

Further details of these and other aspects of the present invention will be apparent from the detailed description and figures included below.

DESCRIPTION OF THE DRAWINGS

Reference is now made to the accompanying figures depicting aspects of the present invention, in which:

FIG. 1 is a cross-sectional side view of a gas turbine engine;

FIG. 2 is a cross-sectional side view showing an interturbine duct of the gas turbine engine of FIG. 1, the interturbine duct being provided with an integral baffle in accordance with an embodiment of the present invention; and FIG. 3 is an enlarged cross-sectional side view of the interturbine duct illustrating a knife edge seal integrated to the baffle.

DETAILED DESCRIPTION OF THE PREFERRED EMBODIMENTS

FIG. 1 illustrates a gas turbine engine 10 of a type preferably provided for use in subsonic flight, generally comprising in serial flow communication a fan 12 through which ambient air is propelled, a multistage compressor 14 for pressurizing the air, a combustor 16 in which the compressed air is mixed with fuel and ignited for generating an annular stream of hot combustion gases, and a turbine section 18 for extracting energy from the combustion gases.

As shown in FIG. 2, the turbine section 18 comprises a turbine casing 17 containing at least first and second turbine stages 20 and 22, also referred to as high pressure turbine (HPT) and low pressure turbine (LPT) stages, respectively. Each turbine stage commonly comprises a shroud $23_H$, $23_L$, a turbine rotor $24_H$, $24_L$ that rotates about a centerline axis of the engine 10, a plurality of turbine blades $25_H$, $25_L$ extending from the rotor, and a stator vane ring $26_H$, $26_L$ for directing the combustion gases to the rotor. The stator vane rings $26_H$, $26_L$ typically comprises a series of circumferentially spaced-apart vanes $27_H$, $27_L$ extending radially between inner and outer annular platforms or shrouds $29_H$, $29_L$ and $31_H$, $31_L$, respectively. The platforms 29, 31 and the vanes 27 are typically made from high-temperature resistant alloys and preferably integrally formed, such as by casting or forging, together as a one-piece component.

An interturbine duct (ITD) 28 extends between the turbine blade $25_H$ of the first turbine stage 20 and the stator vane ring $26_L$ of the second turbine stage 22 for channelling the combustion gases from the first turbine stage 20 to the second turbine stage 22. As opposed to conventional interturbine ducts which are integrally cast/machined with the stationary vane ring $26_L$ of the second turbine stage 22 (see U.S. Pat. No. 5,485,717, for example), the ITD 28 is preferably fabricated from sheet material, such as sheet metal, and brazed, welded or otherwise attached to the turbine vane ring $26_L$. The sheet metal ITD 28 is advantageously much thinner than cast ducts and therefore much more lightweight. The person skilled in the art will appreciate that the use of sheet metal or other thin sheet material to fabricate an interturbine duct is not an obvious design choice due to the high temperatures and pressures to which interturbine ducts are exposed, and also due to the dynamic forces to which the ITD is exposed during operation. Provision for such realities is therefore desired, as will now be described.

The ITD 28 comprises concentric inner and outer annular walls 30 and 32 defining an annular flowpath 34 which is directly exposed to the hot combustion gases that flows theretrough in the direction indicated by arrow 36. The inner and outer annular walls 30 and 32 are preferably a single wall of a thin-walled construction(e.g. sheet metal) and preferably have substantially the same wall thickness. According to an embodiment of the present invention, the inner and outer annular walls 30 and 32 are each fabricated from a thin sheet of metal (e.g. an Inconel alloy) rolled into a duct-like member. It is understood that ITD 28 could also be fabricated of other thin sheet materials adapted to withstand high temperatures. Fabricating the ITD in this manner gives much flexibility in design, and permits the ITD 28 to be integrated with the engine case 17 if desired. The annular walls 30, 32 extend continuously smoothly between their respective ends, without kinks, etc, and thus provide a simple, smooth and lightweight duct surface for conducting combustion gases between turbine stages.

The outer annular wall 32 extends from an upstream edge 35, having annular flange 37 adjacent HPT shroud $23_H$, the flange extending radially away (relative to the engine axis) from ITD 28, to a downstream end flange 38, the flange having an S-bend back to accommodate platform $31_L$ smoothly, to minimize flow disruptions in path 34. The annular end flange portion 38 is preferably brazed to the radially outward-facing surface 39 of the outer platform $31_L$. The outer annular wall 32 is not supported at its upstream end (i.e. at flange 37) and, thus, it is cantilevered from the stator vane set 26 of the second turbine stage 22. The flange 37 is configured and disposed such that it impedes the escape of hot gas from the primary gas path 34 to the cavity surrounding ITD 28, which advantageously helps improve turbine blade tip clearance by assisting in keeping casing 17 and other components as cool as possible. Meanwhile, the cantilevered design of the leading edge 35 permits the leading edge to remain free of and unattached from the turbine support case 17, thereby avoiding interference and/or deformation associated with mismatched thermal expansions of these two parts, which beneficially improves the life of the ITD. The flange 37, therefore, also plays an important strengthening role to permit the cantilevered design to work in a sheet metal configuration.

The inner annular wall 30 is mounted to the stator vane set 26 of the second turbine stage 22 separately from the outer annular wall 32. The inner annular wall 30 has a downstream end flange 40, which is preferably cylindrical to thereby facilitate brazing of the flange to a front radially inwardly facing surface of the inner platform $29_L$ of the stator vane set $26_L$ of the second turbine set 22. The provision of the cylindrical flange 40 permits easy manufacture within tight tolerances (cyclinders can generally be more accurately formed (i.e. within tighter tolerances) than other flange shapes), which thereby facilitates a high quality braze joint with the vane platform.

The inner annular wall 30 is integrated at a front end thereof with a baffle 42 just rearward of the rotor $24_H$ of the first turbine stage 20. The baffle 42 provides flow restriction to protect the rear face of the rotor $24_H$ from the hot combustion gases. The integration of the baffle 42 to the ITD inner annular wall 30 is preferably achieved through a "hairpin" or U-shaped transition which provides the required flexibility to accommodate thermal growth resulting from the high thermal gradient between the ITD inner wall 30 and the baffle 42.

The upstream end portion of the inner annular wall 30 is preferably bent outward at a first 90 degrees bend to provide a radially inwardly extending annular web portion 44, the radial inner end portion of which is bent slightly axially rearward to merge into the inclined annular baffle 42. A forward-facing C-seal 45 is provided forwardly facing on web 44, to provide the double function of impeding the escape of hot gas from the primary gas path 34 and to strengthen and stiffen web 44 against dynamic forces, etc. The inner annular wall 30, the web 44 and the baffle 42 form a one-piece hairpin-shaped member with first and second flexibly interconnected diverging segments (i.e. the ITD inner annular wall 30 and the baffle 42). In operation, the angle defined between the ITD inner annular wall 30 and the baffle 42 will open and close as a function of the thermal gradient therebetween. There is no need for any traditional lug-and-slot arrangement to accept the thermal gradient between the baffle 42 and the ITD inner wall 30. The hairpin configuration is cheaper than the traditional lug and slot arrangement because it does not necessitate any machining and assembly. The baffle 42 is integral to the ITD 28 while still allowing relative movement to occur therebetween during gas turbine engine operation. Since ITD 28 is provided as a single sheet of metal, sufficient cooling must be provided to ensure the ITD has a satisfactory life. For this reason, a plurality of cooling holes 60 is provided in web 44 for approriate communication with an upstream secondary air source (not shown). Cooling holes 60 are adapted to feed secondary air, which would typically be received from a compressor bleed source (not shown) and perhaps passed to holes 60 via an HPT secondary cooling feed system (not shown) theretrough, and directed initially along inner duct 30 for cooling thereof. This cooling helps the single-skin sheet metal ITD to have an acceptable operational life. The U-shaped bent portion of the hairpin-shaped member is subject to higher stress than the rectilinear portion of ITD inner wall 30 and is thus preferably made of thicker sheet material. The first and second sheets are preferably welded together at 46. However, it is understood that the hairpin-shaped member could be made from a single sheet of material.

The baffle 42 carries at a radial inner end thereof a carbon seal 48 which cooperate with a corresponding sealing member 50 mounted to the rotor $24_H$. The carbon seal 48 and the sealing member 50 provide a stator/rotor sealing interface. Using the baffle 42 as a support for the carbon seal is advantageous in that it simplifies the assembly and reduces the number of parts.

As shown in FIG. 3, the stator/rotor interface can be even more simplified by bending the free distal end portion 47 of the baffle 42 radially inwardly and juxtaposing the radially inwardly facing edge 51 to a radially outwardly facing surface of an annular straight shape seal runner 50' mounted to a rear portion of the rotor $24_H$. The radially inwardly disposed distal end portion 47 of the baffle 42 forms a knife edge seal which cooperate with the seal runner 50' to seal the inter-stage cavity bounded by the baffle 42. The edge 51 is spaced from the seal runner 50' by a small clearance or sealing gap. Sufficient clearance must be provided to allow for thermal expansion during engine operation. However, the sealing gap or clearance must be kept as small as possible to limit leakage therethrough. Sealing gaps ranging from about 0.020 inch to about 0.030 inch have been found satisfactory.

The integration of a knife edge seal to baffle 42 is advantageous over the carbon seal design shown in FIG. 2 in that it eliminates the forging step which was required to mount the carbon seal 48 on the baffle 42. It results in a much cheaper arrangement. Also it contributes to significantly reduce the overall weight of the interturbine, baffle and sealing arrangement.

The above description is meant to be exemplary only, and one skilled in the art will recognize that changes may be made to the embodiments described without department from the scope of the invention disclosed. For example, the ITD 28 could be supported in various ways within the engine casing 17. Also, if the stator vane set 27 is segmented, the inner and outer sheet wall of the ITD 28 could be circumferentially segmented. It is also understood that various flex joint or elbows could be used at the transition between the ITD inner wall 30 and the baffle 42. It is also understood that an abradable material could be applied to the sealing runner and/or the inner edge of the baffle 42 to accommodate component rubbing. Finally, it is understood that the above-described integrated duct and baffle arrangement could have other applications. Still other modifications which fall within the scope of the present invention will be apparent to those skilled in the art, in light of a review of this disclosure, and such modifications are intended to fall within the appended claims.

The invention claimed is:

1. An interturbine duct, baffle and seal arrangement adapted to be mounted between first and second adjacent turbine stages of a gas turbine engine, comprising inner and outer flow path containing walls adapted to contain hot combustion gases therebetween, and a baffle integral to the inner flow path containing wall, said baffle defining a boundary of an inter-stage cavity behind the first turbine stage, the baffle having a radially inwardly extending distal end portion having a radially inwardly facing edge juxtaposed to a radially outwardly facing surface of a seal runner, wherein the radially inwardly extending distal end portion of the baffle forms a knife edge seal which cooperates with the seal runner to seal the inter-stage cavity, the inwardly facing edge of the baffle is itself the knife edge, the knife edge and the baffle being a one-piece sheet metal component, thereby performing a sealing function to the arrangement.

2. The interturbine duct, baffle and seal arrangement defined in claim 1, wherein the inner flow path containing wall and the baffle define a hairpin transition area therebetween, and wherein the baffle extends rearwardly from said hairpin transition area before bending into said radially inwardly extending distal end portion.

3. The interturbine duct, baffle and seal arrangement defined in claim 1, wherein said baffle is cantilevered from a front end of said inner flow path containing wall.

4. An interturbine duct, baffle and seal arrangement adapted to be mounted between first and second adjacent turbine stages of a gas turbine engine, comprising an interturbine duct having inner and outer sheet metal walls adapted to contain hot combustion gases therebetween, and an angularly disposed sheet metal baffle extending integrally rearwardly from a front end of the inner sheet metal wall, said sheet metal baffle defining a boundary of an inter-stage cavity behind the first turbine stage, the sheet metal baffle having a distal end portion extending radially inwardly and having a radially inwardly facing edge juxtaposed to a seal runner, the distal end portion of the baffle forming a knife edge seal cooperating with the seal runner to seal the inter-stage cavity, the inwardly facing edge of the sheet metal baffle being itself the knife edge seal, the knife edge seal and the baffle being one-piece sheet metal component, thereby performing a sealing function to the arrangement.

5. The interturbine duct, baffle and seal arrangement defined in claim 4, wherein the distal edge of the baffle is spaced from the seal runner by a small clearance.

6. The interturbine duct, baffle and seal arrangement defined in claim 4, wherein said sheet metal baffle and said inner sheet metal wall define a hairpin transition portion, and wherein a seal is mounted to a forwardly facing surface of the hairpin transition between the sheet metal baffle and the inner sheet metal wall.

7. An interturbine duct, baffle and seal arrangement for a multi-stage turbine engine having an upstream rotor disk carrying a plurality of turbine blades and a downstream stage of turbine vanes, the arrangement comprising a duct extending axially between the upstream rotor disk and the downstream stage of turbine vanes and defining a flow path therebetween, a baffle extending from an upstream end of a radially inner wall of the duct, the radially inner wall and the baffle defining a hairpin cross-section shape, the baffle having a distal end portion defining a radially inner bend, the distal end portion having a radially inwardly facing annular edge juxtaposed to a radially outwardly facing surface of a sealing ring mounted to the upstream rotor disk, the annular edge forming a knife edge seal cooperating with the sealing ring in defining a knife edge seal assembly, the baffle and knife edge seal being provided in a single-piece sheet metal member, the inwardly facing edge of the baffle being itself the knife edge seal, thereby performing a sealing function to the arrangement.

8. The interturbine duct, baffle and seal arrangement defined in claim 7, wherein said baffle and said radially inner wall being integrally made from flexible sheet material.

* * * * *